(12) United States Patent
Maus et al.

(10) Patent No.: US 6,224,691 B1
(45) Date of Patent: May 1, 2001

(54) PROCESS FOR THE PRODUCTION OF A HONEYCOMB BODY FORMED OF SHEET METAL LAYERS OF AT LEAST PARTLY LAMINATED STRUCTURE

(75) Inventors: Wolfgang Maus, Bergisch Gladbach; Ludwig Wieres, Overath, both of (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 09/028,232

(22) Filed: Feb. 23, 1998

Related U.S. Application Data

(63) Continuation of application No. PCT/EP96/03677, filed on Aug. 21, 1996.

(30) Foreign Application Priority Data

Aug. 22, 1995 (DE) .............................. 195 30 850

(51) Int. Cl.[7] ...................................................... F01N 3/28
(52) U.S. Cl. .......................... 148/530; 148/534; 148/535
(58) Field of Search .................................... 148/529, 530, 148/534, 535; 228/181, 193

(56) References Cited

U.S. PATENT DOCUMENTS

| | | | |
|---|---|---|---|
| 4,923,109 | * 5/1990 | Cyron | 228/181 |
| 5,366,139 | 11/1994 | Jha et al. | 228/193 |

FOREIGN PATENT DOCUMENTS

| | | |
|---|---|---|
| 84 12 768 U | 10/1987 | (DE) . |
| 85 27 885 U | 3/1988 | (DE) . |
| 89 00 467 U | 6/1990 | (DE) . |
| 0 201 614 A1 | 11/1986 | (EP) . |
| 0 279 159 A1 | 8/1988 | (EP) . |
| 0 159 468 B1 | 4/1989 | (EP) . |
| 0 220 468 B1 | 8/1989 | (EP) . |
| 0 245 737 B1 | 8/1989 | (EP) . |
| 0 389 750 A1 | 10/1990 | (EP) . |
| 0 454 712 B1 | 8/1992 | (EP) . |
| 10-296090 | * 11/1998 | (JP) . |

OTHER PUBLICATIONS

International Publication No. WO 89/07488 (Maus et al.), dated Aug. 24, 1989.
International Patent Application WO 94/13939 (Wieres et al.), dated Jun. 23, 1994.

* cited by examiner

*Primary Examiner*—George Wyszomierski
(74) *Attorney, Agent, or Firm*—Herbert L. Lerner; Laurence A. Greenberg; Werner H. Stemer

(57) ABSTRACT

A honeycomb body is produced in which metal sheets are stacked and/or wound in a layered configuration. The metal sheets are suitably structured so as to form passages through which a fluid can flow. At least a part of the sheet layers initially comprises a laminate material with a layer of chromium-containing steel and a layer primarily formed of aluminum. The laminate is substantially homogenized by diffusion to a stratified sheet in a subsequent heat treatment. The honeycomb body is assembled with at least a part of the sheet layers provided a structure which increases the degree of elasticity of the honeycomb body and/or the pressure in relation to surface area of the contact locations prior to and in the heat treatment. The honeycomb body is fitted into a tubular casing with such a prestressing that in the heat treatment the contact locations between the sheet layers remain in contact.

7 Claims, 2 Drawing Sheets

PROCESS FOR THE PRODUCTION OF A HONEYCOMB BODY FORMED OF SHEET METAL LAYERS OF AT LEAST PARTLY LAMINATED STRUCTURE

CROSS-REFERENCE TO RELATED APPLICATION

This application is a continuation of copending international application Serial No. PCT/EP96/03677, filed Aug. 21, 1996, which designated the United States.

BACKGROUND OF THE INVENTION

1. Field of the Invention

The present invention relates to the manufacture of honeycomb bodies, and more specifically to a method of producing a honeycomb body comprising metal sheets which are stacked and/or wound in a layer configuration.

2. Description of the Related Art

Honeycomb bodies are used in particular as catalyst carrier bodies for the conversion of exhaust gases of internal combustion engines. Such honeycomb bodies are known for example from international publication WO 89/07488. Catalyst carrier bodies of this type are exposed to high levels of mechanical and thermal loading. Besides the thermal and mechanical loading of the honeycomb body it is exposed to the aggressive gas components which are present in the exhaust gas. The aggressive gas components can result in corrosion of the honeycomb body. It is therefore desirable to produce honeycomb bodies from metal sheets which are resistant to corrosion.

It has become known from European patent EP 0 159 468 B1 to produce honeycomb bodies from steel sheets with a high aluminum content. The production of a honeycomb body from such materials, however, gives rise to problems and involves high costs due to the poor rollability of steel with a high proportion of aluminum.

U.S. Pat. No. 5,366,139 proposes a metal sheet for the production of a honeycomb body which comprises an aluminum-plated steel. The processing of such sheets in the production of the honeycomb body is less expensive as such sheets can be more easily subjected to cold working.

After aluminum-plated metal sheets have been stacked and/or wound in a layered configuration, they are subjected to a subsequent heat treatment. The heat treatment provides for substantial homogenization of metal sheets which have at least a layer of chromium-bearing steel and at least one primarily aluminum-bearing layer. It has been found that, in the production of honeycomb bodies, in particular those with a relatively large cross-section, which have metal sheets with a laminate structure, it is not always possible to guarantee that the metal sheets are connected together and/or to a casing which encloses the honeycomb body. However, a sound connection of the sheet metal layers to each other and/or to a tubular casing enclosing the honeycomb body is a matter of great significance in terms of the mechanical strength of the honeycomb body. It is now known that, when the honeycomb body is subjected to a heat treatment, there may be a reduction in the volume of the sheet metal layers of laminate structure. The reduction in volume of the sheets of a laminate structure is attributed to the fact that the aluminum which forms an outer layer of the metal sheet diffuses into the first layer of chromium-bearing steel, during a heat treatment. The aluminum which diffuses into the layer of chromium-bearing steel however does not increase the volume of that layer, to the extent to which there is the reduction in volume of the aluminum layer. In addition, layered or laminate sheets have only a low degree of elasticity during the homogenization procedure.

SUMMARY OF THE INVENTION

It is accordingly an object of the invention to provide a method of producing a honeycomb body whose sheet layers at least in part initially comprise a layered or laminate material which has at least one layer of chromium-bearing steel and at least one primarily aluminum-bearing layer which are substantially homogenized in a subsequent heat treatment by diffusion, which overcomes the above-mentioned disadvantages of the prior art devices and methods of this general type and which compensates for the reduction in volume which occurs due to homogenization of the sheets so that nonetheless connections which can carry a high loading are produced between the sheets.

With the foregoing and other objects in view there is provided, in accordance with the invention, a method of producing a honeycomb body assembly, which comprises:

providing sheet metal at least partially formed of a laminate material with a layer of chromium-containing steel and a layer primarily containing aluminum;

forming a layered sheet metal honeycomb body with structured sheet metal layers defining passages through which a fluid can flow;

fitting the honeycomb body into a tubular casing with a defined degree of prestressing; and subjecting the honeycomb body to heat treatment and substantially homogenizing the laminate material by diffusion;

wherein at least a portion of the sheet layers has a structure which increases a degree of elasticity of the honeycomb body prior to and in the heat treatment and wherein the degree of prestressing is defined such that contact locations between adjacent sheet metal layers remain in contact in the heat treatment.

In accordance with an added feature of the invention, the sheet metal is formed with additional microstructures reducing a total surface area of the contact locations between the adjacent sheet layers and for reducing the degree of prestressing necessary to maintain the contact locations in contact during the heat treatment.

In accordance with an additional feature of the invention, the additional microstructures are formed transversely, obliquely, or parallel to the direction along which the fluid passages extend.

In accordance with another feature of the invention, the micro-structures are formed such that the microstructures in adjacent sheets are substantially or entirely prevented from engaging one another in a form-lock.

In accordance with a further feature of the invention, the sheet layers are formed with structures interlocking adjacent sheet layers such that the sheet layers are prevented from relative movement even where the degree of prestressing is substantially reduced or virtually eliminated during the heat treatment.

In accordance with again a further feature of the invention, an elastic intermediate layer is inserted between the tubular casing and the honeycomb body for maintaining a degree of prestressing in the honeycomb body during the heat treatment.

In accordance with a concomitant feature of the invention, the tubular casing has a lower coefficient of thermal expansion than the honeycomb body material.

To avoid large areas in which the sheet layers are not connected to one other and/or to the casing, or only weakly connected, when the heat treatment causes a change in volume of the metal sheets which are stacked and/or wound in layers, the invention proposes that at least a part of the sheet layers is of a structure which increases the elasticity of the honeycomb body prior to and in the heat treatment. In that respect the honeycomb body is fitted into a tubular casing with such a prestressing effect that, in the heat treatment, the locations of contact between the sheet layers remain in contact. That operating procedure provides a honeycomb body which is resistant to corrosion by virtue of the choice of the material for the sheet layers and which also has a high level of thermal and mechanical stability. The contact in respect of the contact locations between the sheet layers is always guaranteed during the heat treatment, by virtue of the structure which enhances the elasticity of the honeycomb body prior to and in the heat treatment and the fact that the honeycomb body is introduced into a tubular casing in a prestressed condition, in spite of possibly only slight elasticity of the materials used. Ensuring contact at the contact locations between the sheet layers is also an aspect of significance in terms of forming the connections between the sheet layers. The sheets are connected together at their contact locations, by the heat treatment. The sheets are connected together for example by virtue of the fact that aluminum-steel alloys have a substantially lower melting point than steel so that the inner layer of the metal sheets of layered or laminate structure temporarily liquefies and an intimate connection is produced in the region around the contact locations, such connection virtually enjoying the property of a welded connection. By virtue of the concentration gradient, the aluminum migrates further into the inner layer of the metal sheets, whereby depletion of the aluminum content in the connecting region occurs and as a result the melting point in the connecting region is raised so that the connecting location hardens. Besides or alternatively to such forms of connection of the sheet layers to each other, at least a part of the metal sheets can be at least partially brazed so that the metal sheets are also connected together by an additional brazing connection at least in portions thereof.

Elasticity-enhancing structures for finished honeycomb bodies which are also suitable for the improvement in the manufacturing procedure are known per se in many different forms from the state of the art, without however the significance thereof being recognised in terms of the manufacturing procedure when using sheets of a layered structure. Thus EP 0 220 468 B1 describes various kinds of double corrugations which can be formed in corrugated and/or smooth sheet layers. It is also known for the substantially smooth sheet layers in a honeycomb body to be provided with an additional microcorrugation which is also advantageous for the present production procedure.

A particularly elastic configuration is attained where the sheets are each alternately obliquely corrugated so that the corrugations cross each other at an angle and no contact lines are formed, but relatively small contact locations. This is described for example in EP 0 245 737.

Finally, microstructures are also known from EP 0 454 712 B1, for the purposes of influencing the flow properties of the resulting article of manufacture. Surprisingly, such microstructures have also been found to be such as to promote the production procedure in connection with the object specified herein. Such microstructures can be used on the one hand in order considerably to reduce the total surface of the contact locations in a honeycomb body, whereby the force in relation to contact surface area is correspondingly increased with the level of elasticity remaining the same, and good connecting locations are produced. In addition such microstructures can also further enhance elasticity. On the other hand those structures can also be used for producing positively locking connections between the sheet layers, whereby displacement of the sheets relative to each other during the production procedure is avoided and the mechanical load-carrying capability of the finished honeycomb body is improved. Depending on the respective situation of use involved the microstructures are therefore so arranged that they rarely or often come to lie one within the other.

In accordance with a particularly preferred embodiment of the invention, the additional microstructures reduce the total surface area of the contact locations between the sheet layers, at least on a part of the sheet layers. That reduces the prestressing necessary to maintain the contact locations, during the heat treatment.

The additional structures which are provided for ensuring the connections between the sheet layers are preferably structures which extend transversely or inclinedly with respect to the direction of the passages. The additional structures however may also extend substantially in the direction of the passages.

In accordance with an additional feature of the invention, the microstructures are formed in adjacent sheets in such a way that mechanical clamping or clipping engagement of the adjacent microstructures does not occur or occurs only rarely.

The mechanical clamping or clipping engagement can occur due to adjacent microstructures engaging one into the other in positively locking relationship. To prevent such clamping or clipping engagement effects from occurring, the adjacent sheets preferably have differently oriented microstructures. The microstructures may also have different contours or shaped pressed configurations so as to prevent adjacent microstructures from coming into mutual engagement. Eliminating the mechanical clamping or clipping engagement by virtue of the microstructures engaging one into the other in positively locking relationship increases the pressure in relation to surface area at the contact locations.

Particularly in the case of spirally wound honeycomb bodies however it may be advantageous if the sheet layers are clipped together by structures of adjacent sheet layers engaging one into the other in positively locking relationship. That arrangement provides that the sheet layers cannot move relative to each other and in particular cannot be involved in a telescoping movement, even with only a very low level of prestressing, during the heat treatment. The microstructures or structures are in that case of such a configuration that the interengaging microstructures or structures remain in engagement even after homogenization of the sheets of layered or laminate structure.

Besides the structural changes in the laminate sheet layers during the heat treatment, the tubular casing which is disposed around the sheet layers also expands. The level of prestressing of the sheet layers which are fitted into the tubular casing decreases due to the the thermally induced expansion of the tubular casing. In order substantially to maintain the prestressing effect in the honeycomb body during the heat treatment, in accordance with an advantageous development there is provided an elastic intermediate layer which is fitted between the tubular casing and the honeycomb body. The intermediate layer also compensates in the course of manufacture for the different degrees of shrinkage of the tubular casing and the honeycomb body after the cooling operation.

Maintaining the prestressing effect in the honeycomb body is also promoted by using a tubular casing with a lower coefficient of thermal expansion than that of the honeycomb body material.

Other features which are considered as characteristic for the invention are set forth in the appended claims.

Although the invention is illustrated and described herein as embodied in a process for the production of a honeycomb body comprising sheet metal layers which are at least in part of a laminate structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
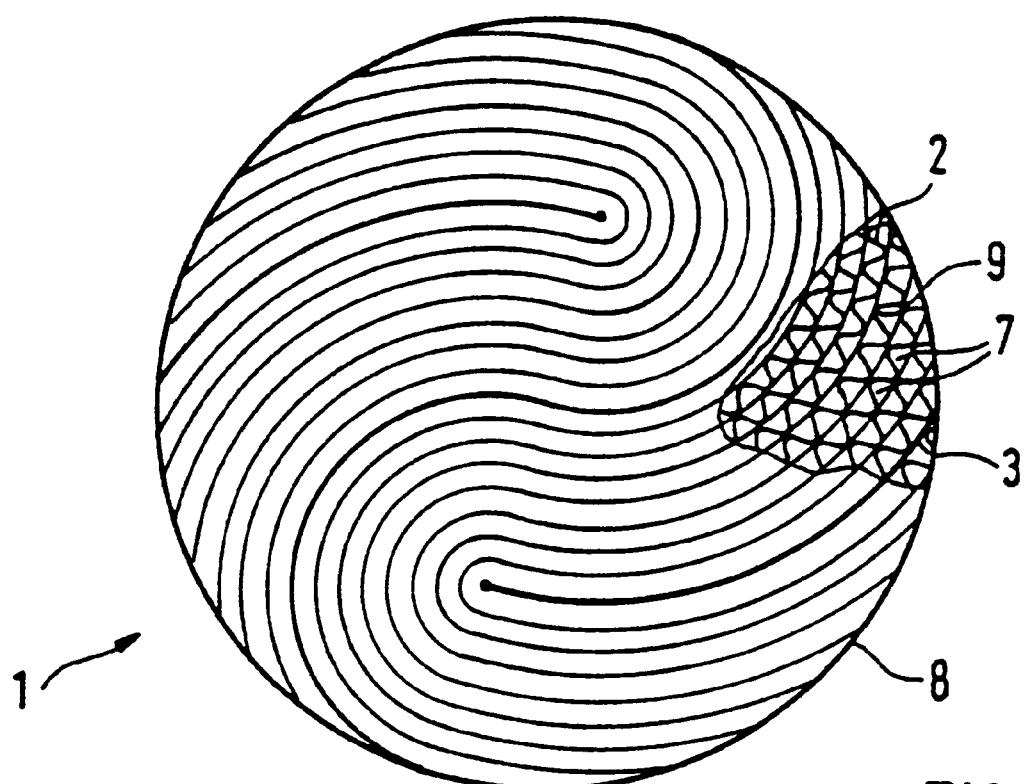
FIG. 1 is a partly completed, diagrammatic cross-sectional view of a honeycomb body.
Figure 2:
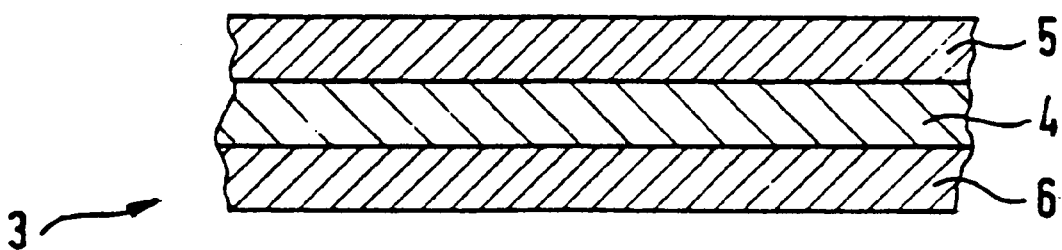
FIG. 2 is a partial sectional view showing a metal sheet of a layered or laminate structure.

Referring now to the figures of the drawing in detail and first, particularly, to FIGS. 1 and 2 thereof, there is seen a honeycomb body 1 in which metal sheets 2, 3 are twisted in a laminate layered configuration. The metal sheets 3 are structured with corrugations forming passages 7 through which a fluid can flow. As shown in FIG. 2, the sheets 3 initially comprise a layered or laminate material. The sheet 3 has a layer 4 of chromium-containing steel and, on both sides of the layer 4, a respective layer 5, 6 primarily containing aluminum. The layers 4, 5 and 6 of the sheet 3 are substantially homogenized in a subsequent heat treatment by diffusion. The individual layers are no longer pronouncedly visible after the heat treatment step. The structure may be generically defined as a stratified or laminated sheet.

In the illustrated embodiment the laminated sheets 3 are corrugated. In principle the smooth sheet layers or all sheet layers of the honeycomb body may comprise such laminated sheets.

The stacked and wound sheet layers are fitted into a tubular casing 8. Here, the honeycomb body formed by the sheets 2, 3 is fitted into the tubular casing 8 with such a degree of prestressing that, in the ensuing heat treatment, the contact locations 9 between the sheet layers remain in contact. An assistance in that respect is an additionally provided structure which increases the degree of elasticity, as will be described with reference to the following figures.

Figure 3:
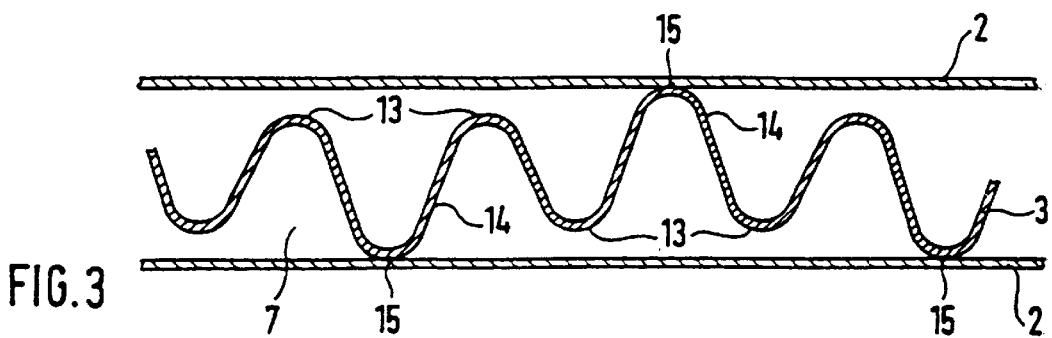
FIG. 3 partial, cross-sectional diagrammatic view of adjacent sheets with double corrugation.

FIG. 3 illustrates, by way of example, one of a plurality of possible double corrugations. There, a corrugated sheet has corrugation crests 13, 14 of different amplitude so that only a portion of the corrugation maxima forms contact locations 15 with adjacent sheet layers 2. Such a result can also be achieved by virtue of different corrugations in the adjacent layers. At any event, the elasticity of the body is increased in that way during manufacture.

Figure 4:
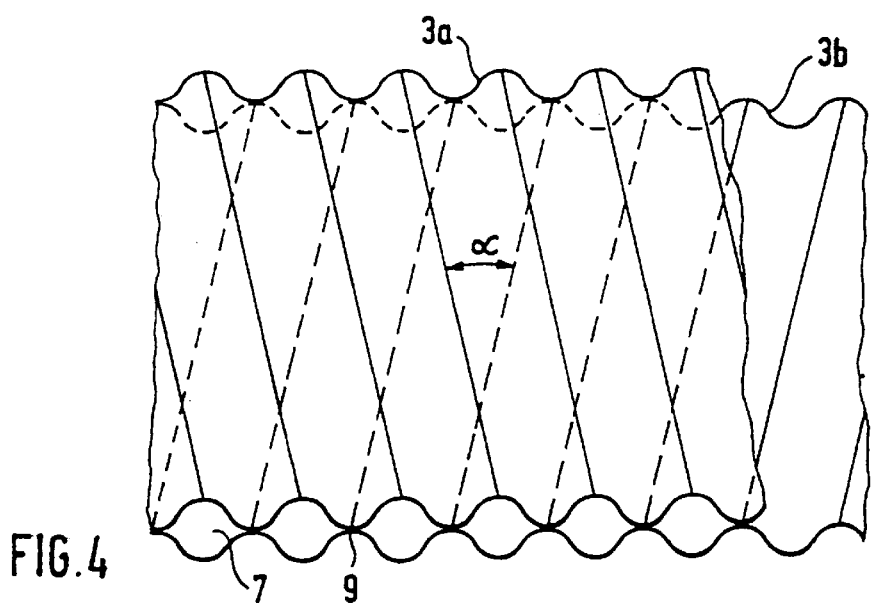
FIG. 4 is a partial perspective view of obliquely corrugated sheet layers with mutually crossing corrugations.

FIG. 4 shows a further exemplary embodiment in which simultaneously the degree of elasticity is increased and the pressure in relation to surface area of the contact locations 9 during manufacture. The sheet layers 3a, 3b are alternately obliquely corrugated in different orientations. The corrugations cross each other with an intersection angle α. Such an embodiment is desirable in terms of production as well as the resultant flow properties in the finished article of manufacture.

Figure 5:
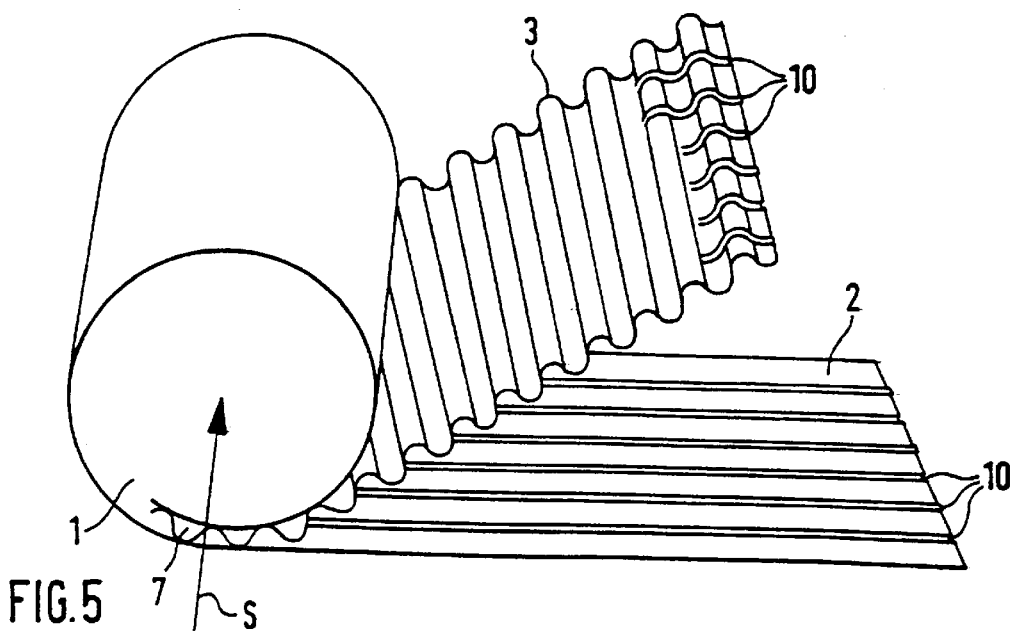
FIG. 5 is a perspective view of a partially rolled honeycomb body with microstructures.

With reference to FIG. 5, the smooth sheets 2 and/or the corrugated sheets 3 may have microstructures 10 which extend substantially transversely with respect to a direction S of the passages 7. By virtue of the structures 10 of the adjacent sheet layers 2, 3, they are either held together in clamping or clipping relationship so that the sheet layers cannot move relative to each other even if there is still only a very low level of prestressing, during the heat treatment, or, in the case of an arrangement which avoids a clamping or clipping engagement, the pressures in relation to surface area at the contact locations are increased. At any event the microstructures increase the degree of elasticity during manufacture.

The invention serves for the production of advanced, inexpensive, mechanically loadable honeycomb bodies with a high level of corrosion resistance, in particular for use as catalyst carrier bodies.

We claim:

1. A method of producing a honeycomb body assembly, which comprises:

providing sheet metal containing a laminate material with a layer of chromium-containing steel and a layer containing aluminum;

forming a layered sheet metal honeycomb body with structured sheet metal layers defining passages through which a fluid can flow, at least a portion of the sheet metal layers having a structure that increases a degree of elasticity of the honeycomb body prior to and during heat treatment;

forming the sheet metal with additional microstructures for reducing a total surface area of contact locations between the adjacent sheet layers and for reducing a degree of prestressing necessary to maintain the contact locations in contact during heat treatment and forming the additional microstructures such that the additional microstructures in adjacent sheets are substantially prevented from engaging one another in a form-lock;

fitting the honeycomb body into a tubular casing with a defined degree of prestressing, the degree of prestressing defined such that at least one of the contact locations between adjacent sheet metal layers remains in contact in the heat treatment; and subjecting the honeycomb body to heat treatment and substantially homogenizing the laminate material by diffusion.

2. The method according to claim 1, wherein the passages through which a fluid can flow extend along a given direction, and wherein the step of forming the additional microstructures comprises forming the additional microstructures such that they are oriented transversely to the given direction.

3. The method according to claim 1, wherein the passages through which a fluid can flow extend along a given direction, and wherein the step of forming the additional microstructures comprises forming the additional microstructures such that they are oriented obliquely to the given direction.

4. The method according to claim 1, wherein the passages through which a fluid can flow extend along a given direction, and wherein the step of forming the additional microstructures comprises forming the additional microstructures such that they are oriented substantially parallel to the given direction.

5. The method according to claim 1, wherein the microstructures are formed such that the microstructures in adjacent sheets are prevented from engaging one another in a form-lock.

6. The method according to claim 1, which further comprises inserting an elastic intermediate layer between the tubular casing and the honeycomb body for maintaining a degree of prestressing in the honeycomb body during the heat treatment.

7. The method according to claim 1, which comprises providing the tubular casing with a lower coefficient of thermal expansion than the honeycomb body material.

* * * * *